(12) United States Patent
Lundman

(10) Patent No.: US 7,455,077 B2
(45) Date of Patent: Nov. 25, 2008

(54) INFLATABLE PLUG WITH FLANGE

(76) Inventor: Philip L. Lundman, 3631 Fredonia Kohler Dr., Fredonia, WI (US) 53021

( * ) Notice: Subject to any disclaimer, the term of this patent is extended or adjusted under 35 U.S.C. 154(b) by 0 days.

(21) Appl. No.: 11/621,725

(22) Filed: Jan. 10, 2007

(65) Prior Publication Data

US 2008/0163951 A1    Jul. 10, 2008

(51) Int. Cl.
*F16L 55/12*    (2006.01)
(52) U.S. Cl. .......................... 138/93; 138/89
(58) Field of Classification Search ............... 138/93, 138/89, 90, 97, 91, 94
See application file for complete search history.

(56) References Cited

U.S. PATENT DOCUMENTS

| | | | | |
|---|---|---|---|---|
| 1,180,182 A | | 4/1916 | Petersen ...................... | 138/93 |
| 1,506,418 A | * | 8/1924 | Evensta et al. ................ | 138/90 |
| 1,760,750 A | | 5/1930 | Goodman .................... | 138/93 |
| 2,299,116 A | | 10/1942 | Svirsky ........................ | 138/90 |
| 2,678,666 A | | 5/1954 | Theis et al. .................... | 138/93 |
| 2,753,876 A | | 7/1956 | Kurt ........................ | 134/167 C |
| 2,755,810 A | | 7/1956 | Kurt ........................ | 134/167 C |
| 3,164,964 A | * | 1/1965 | Josephson .................... | 175/19 |
| 3,182,725 A | | 5/1965 | Moore ........................ | 166/66.4 |
| 3,357,193 A | | 12/1967 | Fitzgibbon .................. | 405/303 |
| 3,431,946 A | | 3/1969 | Sawyer ........................ | 138/93 |
| 3,618,639 A | | 11/1971 | Daley et al. .................... | 138/97 |
| 3,714,951 A | | 2/1973 | Lundman ................ | 134/167 C |
| 3,842,864 A | | 10/1974 | Riegel et al. .................... | 138/93 |
| 3,902,528 A | | 9/1975 | Tartabini et al. .............. | 138/90 |
| 3,946,761 A | | 3/1976 | Thompson et al. ............ | 138/98 |
| 3,958,607 A | | 5/1976 | Gray ............................ | 138/97 |
| 4,079,755 A | * | 3/1978 | Van der Lans ................ | 138/93 |
| 4,160,464 A | | 7/1979 | Ballinger ...................... | 138/93 |
| 4,291,727 A | | 9/1981 | Yie et al. ...................... | 138/93 |
| 4,354,515 A | | 10/1982 | Sutherland .............. | 134/167 C |
| 4,365,649 A | | 12/1982 | Jones ........................... | 138/93 |
| 4,413,653 A | | 11/1983 | Carter, Jr. ..................... | 138/89 |
| 4,413,655 A | | 11/1983 | Brown .......................... | 138/97 |
| 4,423,754 A | | 1/1984 | Carter, Jr. ..................... | 138/93 |
| 4,436,120 A | | 3/1984 | Josien et al. ................... | 138/93 |
| 4,449,584 A | | 5/1984 | Christensen ................. | 166/187 |
| 4,458,721 A | | 7/1984 | Yie et al. ....................... | 138/93 |
| 4,467,835 A | | 8/1984 | Champleboux .............. | 138/93 |
| 4,467,836 A | | 8/1984 | Ragout ........................ | 138/93 |
| 4,514,447 A | | 4/1985 | Boxmeyer ................. | 428/36.3 |
| 4,550,751 A | * | 11/1985 | Shimamura et al. ........... | 138/93 |

(Continued)

*Primary Examiner*—Patrick F Brinson
(74) *Attorney, Agent, or Firm*—Michael Best & Friedrich LLP

(57) ABSTRACT

An inflatable plug insertable into a conduit and inflatable therein to restrict fluid flow comprises a bladder having an interior surface and an exterior surface and at least one fabric layer covering at least a portion of the exterior surface of the bladder. The inflatable plug also comprises a first plate, a second plate, and at least one fluid port. The first plate is positioned inside the bladder and adjacent to the interior surface of the bladder. The second plate is positioned outside the bladder and adjacent to the at least one fabric layer. The second plate is coupled to the first plate such that the first plate and the second plate clamp a portion of the at least one fabric layer and a portion of the bladder therebetween. The at least one fluid port extends through the first plate and the second plate and facilitates inflation and deflation of the bladder.

22 Claims, 7 Drawing Sheets

U.S. PATENT DOCUMENTS

| | | | |
|---|---|---|---|
| 4,552,166 A * | 11/1985 | Chadbourne, Sr. et al. | 137/15.04 |
| 4,565,222 A | 1/1986 | Lundman | 138/93 |
| 4,614,206 A | 9/1986 | Mathison et al. | 138/93 |
| 4,646,787 A | 3/1987 | Rush et al. | 138/98 |
| 4,660,603 A | 4/1987 | Tash | 138/92 |
| 4,883,094 A * | 11/1989 | Vetter | 138/89 |
| 4,890,483 A | 1/1990 | Vetter | 73/40.5 R |
| 4,895,185 A | 1/1990 | Champleboux et al. | 138/109 |
| 4,995,761 A | 2/1991 | Barton | 405/184.1 |
| 5,353,842 A | 10/1994 | Lundman | 138/93 |
| 5,372,162 A | 12/1994 | Frey | 138/98 |
| 5,379,802 A * | 1/1995 | VanderLans | 138/89 |
| 5,546,991 A * | 8/1996 | Mathison et al. | 138/93 |
| 5,643,386 A | 7/1997 | Mathison et al. | 156/218 |
| 5,785,090 A * | 7/1998 | VanderLans | 138/89 |
| 5,901,752 A | 5/1999 | Lundman | 138/93 |
| 5,934,311 A | 8/1999 | Brown | 137/240 |
| 5,996,621 A | 12/1999 | Hagiwara et al. | 137/565.33 |
| 6,276,398 B1 | 8/2001 | Lange | 138/98 |
| 6,361,015 B1 | 3/2002 | Warmerdam | 251/5 |
| 6,446,669 B1 | 9/2002 | Lundman | 138/91 |
| 6,568,429 B2 | 5/2003 | Lundman | 138/91 |
| 6,691,786 B2 | 2/2004 | Patel | 166/375 |
| 6,899,138 B2 | 5/2005 | Lundman | 138/93 |
| 6,959,734 B2 | 11/2005 | Lundman | 138/93 |
| 2004/0003855 A1 | 1/2004 | Dees et al. | 138/93 |

* cited by examiner

INFLATABLE PLUG WITH FLANGE

FIELD

Embodiments of the invention generally relate to inflatable plugs for conduits.

BACKGROUND

Inflatable plugs are used for plugging conduits, such as sewer lines, gas lines, or oil pipelines, to permit maintenance, facilitate toxic waste containment, or remove blockages. Such plugs couple to fluid lines to facilitate inflation and deflation within conduits.

SUMMARY

The following summary sets forth certain exemplary embodiments of the invention. It does not set forth all such embodiments and is not limiting of embodiments of the invention.

In one embodiment, an inflatable plug insertable into a conduit and inflatable therein to restrict fluid flow comprises a bladder having an interior surface and an exterior surface and at least one fabric layer covering at least a portion of the exterior surface of the bladder. The inflatable plug also comprises a first plate, a second plate, and at least one fluid port. The first plate is positioned inside the bladder, adjacent to the interior surface of the bladder. The second plate is positioned outside the bladder, adjacent to the at least one fabric layer. The second plate is coupled to the first plate such that the first plate and the second plate clamp a portion of the at least one fabric layer and a portion of the bladder therebetween. The at least one fluid port extends through the first plate and the second plate and facilitates inflation and deflation of the bladder.

In another embodiment, a method of assembling an inflatable plug, which is insertable into a conduit and inflatable therein to restrict fluid flow, comprises positioning a bladder material having an outer surface on top of a first plate, and covering the outer surface of the bladder material with at least one fabric material. The method also includes positioning a second plate on top of the at least one fabric layer, coupling the first plate to the second plate, and forming a closed bladder using at least the bladder material.

Various embodiments herein can allow higher operating pressures than existing plugs. Additionally, embodiments herein can be configured for inflation and deflation on an end or on a side of a plug, for example.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Embodiments of the invention relate to inflatable plugs. While deflated, a plug is insertable into a conduit, such as a sewer line, an oil pipeline, a gas line, or a water main, through a hot tap in the conduit. Once inserted, the plug is inflated to restrict fluid flow through the conduit. Restricting fluid flow permits repair and/or maintenance (e.g., cleaning, patching holes, etc.) to be performed on the conduit. In various embodiments, a flange is positioned on the plug and configured to couple with fluid lines for inflation and deflation of the plug.

Embodiments of the inflatable plugs described below are adaptable to have inflation diameters between about 4 inches and 120 inches and are capable of an inflation pressure up to about 150 pounds per square inch gauge (psig). Additional inflation diameters and pressures may be achieved by adjusting various components of the plugs. Plug lengths may also be adjusted depending on the application.

Figure 1:
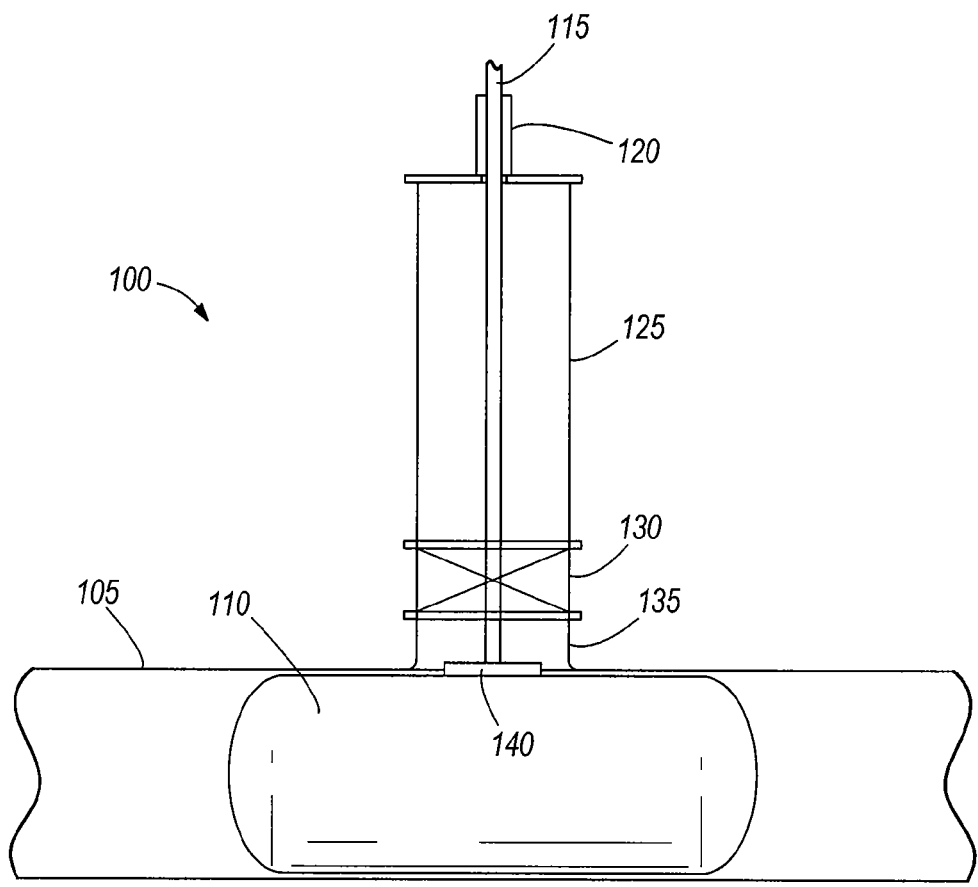
FIG. 1 shows a system according to an embodiment of the invention.

FIG. 1 shows a system 100 according to an embodiment of the invention. The system 100 includes an inflatable plug 110, a tube 115, a packing seal 120, a launch cylinder 125, a valve 130, and a tapping saddle 135. The system 100 is configured for use in a conduit 105. In the illustrated embodiment, the plug 110 is inflated to restrict fluid flow through the conduit 105.

The tapping saddle 135 couples to the conduit 105 by bolts, welding, or electro-fusion. The valve 130 (e.g., a full port valve) is coupled to the tapping saddle 135 to allow selective access through the tapping saddle 135 to an interior of the conduit 105 through a hole (e.g., hot tap) formed thereon. The launch cylinder 125 couples to the valve 130 and guides the tube 115 (e.g., an inflation ram) and the deflated plug 110 into the interior of the conduit 105. The packing seal 120 is positioned around the tube 115 to prevent any fluid in the conduit 105 from leaking out through the launch cylinder 125.

The tube 115 is coupled to and in fluid communication with the plug 110 via a flange 140. The flange 140 is positioned on a side of the plug 110 and couples to the tube 115 to facilitate fluid flow into and out of the plug 110. The flange 140 may be constructed of, for example, metals, ceramics, or high-density plastics. Fluid entering the plug 110 may be, for example, air, nitrogen, water, or other liquids and gases suitable for inflation of the plug 110. The fluid may also be drawn from the plug 110 and through the flange 140 to allow for deflation of the plug 110.

Figure 2:
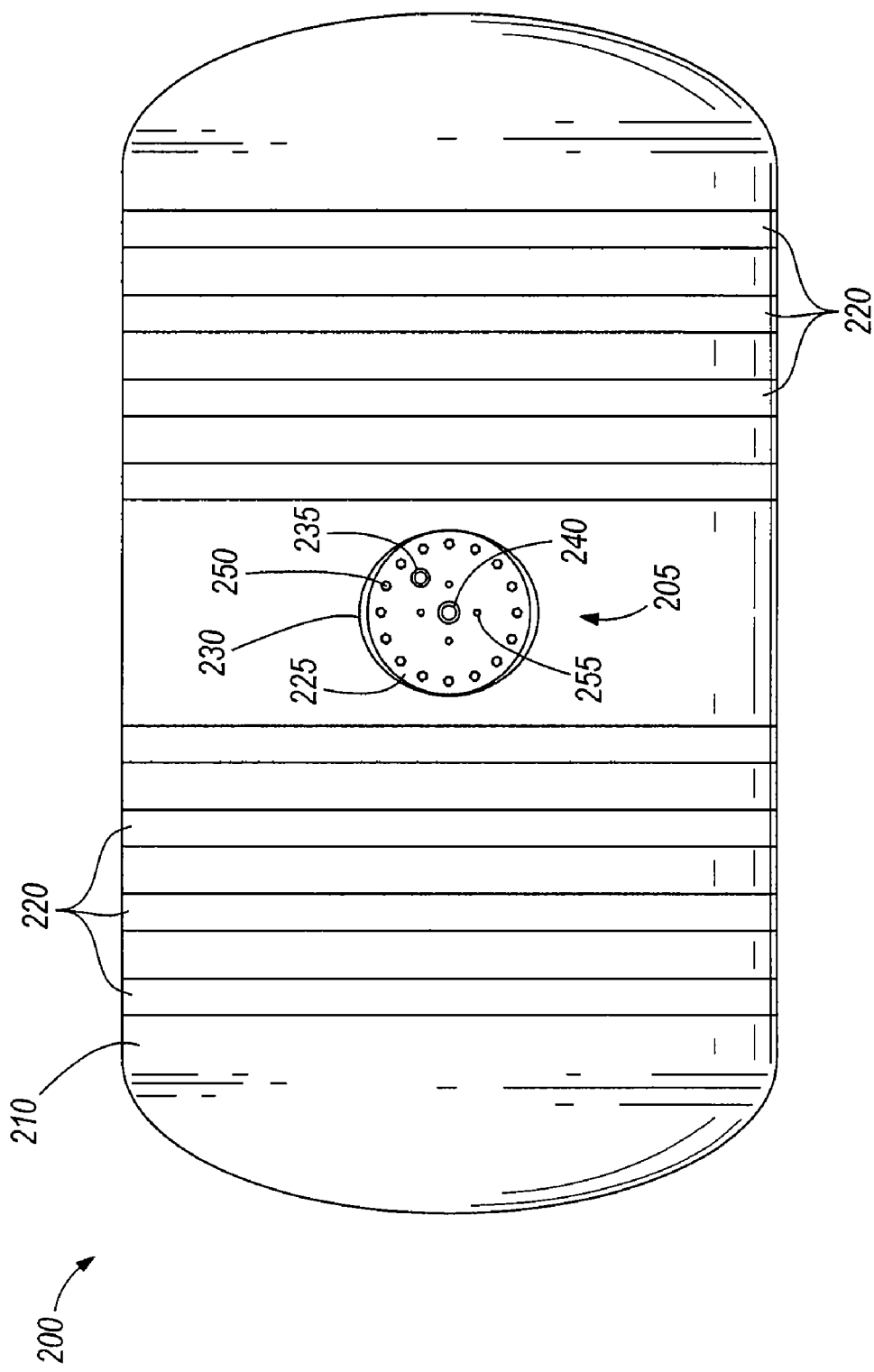
FIG. 2 shows a top view of an inflatable plug having a flange according to an embodiment of the invention.

FIG. 2 shows a top view of an inflatable plug 200 having a flange 205 according to an embodiment of the invention. The plug 200 and the flange 205 are one implementation of the plug 110 and the flange 140 of FIG. 1. The plug 200 is generally cylindrical and includes an inner bladder 330 (see FIGS. 3 and 4), a plurality of fabric layers 210, 315, 325 (see FIGS. 3 and 4), and a plurality of outer straps 220. In the illustrated embodiment, the plug 200 includes eight outer straps 220 spaced apart and positioned adjacent an outermost fabric layer 210. As shown in FIG. 2, the outer straps 220 are positioned on an exterior surface of the outermost fabric layer 210; however, in other embodiments, the outer straps 220 may be positioned between the outermost fabric layer 210 and an inner fabric layer 315. The outer straps 220 circumferentially surround the plug 200 and increase the sealing capabilities of the plug 200. The outer straps 220 may be constructed of, for example, low durometer butyl rubber, Buna-N rubber, or ballistic nylon. In some embodiments, the outer straps 220 may have a relatively high coefficient of friction to resist sliding of the inflated plug 200 within the conduit 105.

The flange 205 is positioned on a side of the plug 200 and includes a top plate 225 and a bottom plate 310 (see FIG. 3) coupled to the top plate 225 via fasteners 250 (e.g., bolts, screws, nails, etc.). The fasteners 250 are positioned along a circumference of the top plate 225 and extend through the top plate 225, through the fabric layers 210, 315, 325 and the bladder 330, to the bottom plate 310. In the illustrated embodiment, the top and bottom plates 225, 310 are circular in shape and positioned such that the bottom plate 310 is aligned with the top plate 225. In other embodiments, the top and bottom plates 225, 310 may be other shapes (e.g., square, octagonal, etc.), and/or may not be aligned with each other.

The flange 205 includes a water port 240 and an air port 235. In the illustrated embodiment, the water port 240 is positioned in the center of the flange 205, and the air port 235 is positioned near an edge of the flange 205. It should be apparent to one skilled in the art that the positions of the ports 235, 240 may be exchanged or the positions may be modified to other suitable locations on the flange 205. Additionally or alternatively, fewer or more ports may be provided to allow fluid flow or to support additional internal or external instrumentation (e.g., sensors, transducers, detectors, etc.) for plug monitoring.

The water port 240 provides fluid access to an interior region of the plug 200. In the embodiment illustrated in FIGS. 2 and 3, the water port 240 is defined by the top plate 225 and the bottom plate 310. Water or other liquids move (e.g., flow) through the water port 240 to inflate and deflate the plug 200. In some embodiments, the water port 240 may include a ball valve with a cam and groove coupling to facilitate connection of a water line to the water port 240.

The air port 235 also provides fluid access to an interior region of the plug 200. In the embodiment illustrated in FIGS. 2 and 3, the air port 235 is defined by the top plate 225 and the bottom plate 310. Air, nitrogen, or other gases flow through the air port 235 to inflate and deflate the plug 200. In some embodiments, the air port 235 may include a ball valve with a quick connect/disconnect coupling to facilitate connection of an air line to the air port 235.

In some embodiments, air, not water, is used to initially inflate the plug 200 when the plug 200 is being positioned. As such, the position of the plug 200 may be adjusted more easily within the conduit 105. Water is then injected into the plug 200, exhausting the air through the air port 235 and preventing potential shifting of the plug 200 within the conduit 105.

The flange 205 also includes four bores 255 located radially inward of the fasteners 250. The bores 255 are positioned about the water port 240 to facilitate coupling of the tube 115 to the flange 205. For example, the tube may include a bracket 400 (see FIG. 4) having corresponding bores. The bores 255 of the flange 205 and the bores of the bracket 400 may receive fasteners 420 to secure the tube 115 to the flange 205. In the illustrated embodiment, the bores 255 are positioned to couple the bracket 400 and the tube 115 around only the water port 240. In other embodiments, the bores 255 may be positioned to couple the bracket 400 and the tube 115 around both the water port 240 and the air port 235 or around only the air port 235.

A cushion 230 (e.g., a polyurethane cushion or other suitable cushion) is positioned between the outermost fabric layer 210 and the top plate 225. The cushion 230 is generally a shape similar to the top plate 225. During assembly of the top plate 225 on the plug 200, the cushion 230 compresses and deforms and may extend slightly past an edge of the top plate 225, as shown in FIG. 2. In some embodiments, a second cushion 405 (see FIG. 4) is positioned between the bladder 330 and the bottom plate 310. The cushions 230, 405 prevent the top and bottom plates 225, 310 from creating stress lines or tears in the bladder 330 and the fabric layers 210, 315, 325.

Figure 3:
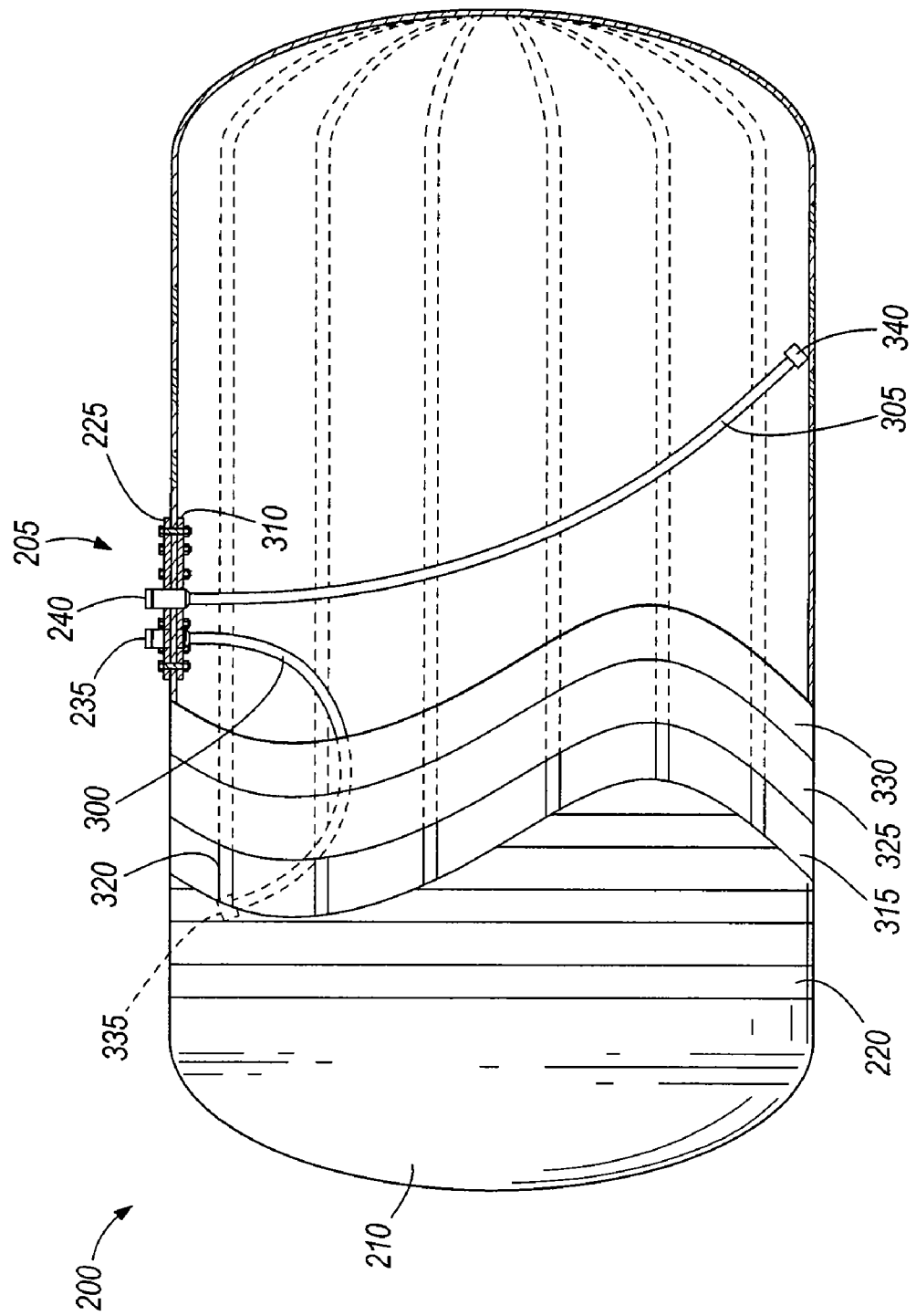
FIG. 3 shows a partial cross-sectional view of the inflatable plug of FIG. 2.

FIG. 3 shows a partial cross-sectional view of the plug 200. In the illustrated embodiment, the plug 200 includes the bladder 330, two inner fabric layers 315, 325, a webbing 320, and the outermost fabric layer 210. The bladder 330 is the innermost layer and defines the interior region of the plug 200. The fabric layers 210, 315, 325 surround and enclose the bladder 330, protecting the bladder 330 from puncturing or tearing. The bladder 330 may be constructed of, for example, a polyurethane or other impermeable material; the inner fabric layers 315, 325 may be constructed of a ballistic strength nylon material or Kevlar® (available from DuPont Advanced Fiber Systems of Richmond, Va.); and the outermost fabric layer 210 may be constructed of a ballistic strength nitrile-coated nylon material.

The webbing 320 (which may also be constructed of a ballistic strength nylon material) is positioned between one of the inner fabric layers 315 and the outermost fabric layer 210 to increase the strength of the plug 200. The webbing 320 extends circumferentially and lengthwise along the plug 200, culminating at each end of the plug 200. In some embodiments, a fabric patch (e.g., a square of webbing material) may be positioned at each end of the plug 200 such that the webbing 320 may couple to the fabric patch. Additionally or alternatively, more or fewer fabric layers 210, 315, 325 and/or webbings 320 may be used to adjust the strength of the plug 200.

As shown in FIG. 3, a water tube 305 extends from the water port 240 into the plug 200 and an air tube 300 extends from the air port 235 into the plug 200. The water tube 305 includes a weight 340 coupled to an end opposite from the water port 240, such that the water tube 305 sinks and fills the plug 200 with water from a bottom of the plug 200. The air tube 300 includes a float 335 coupled to an end opposite the air port 235, such that the air tube 300 floats on the water and exhausts only air from the plug 200. Additionally, the air tube 300 may include a pressure gauge to measure the inflation pressure of the plug 200.

Figure 4:
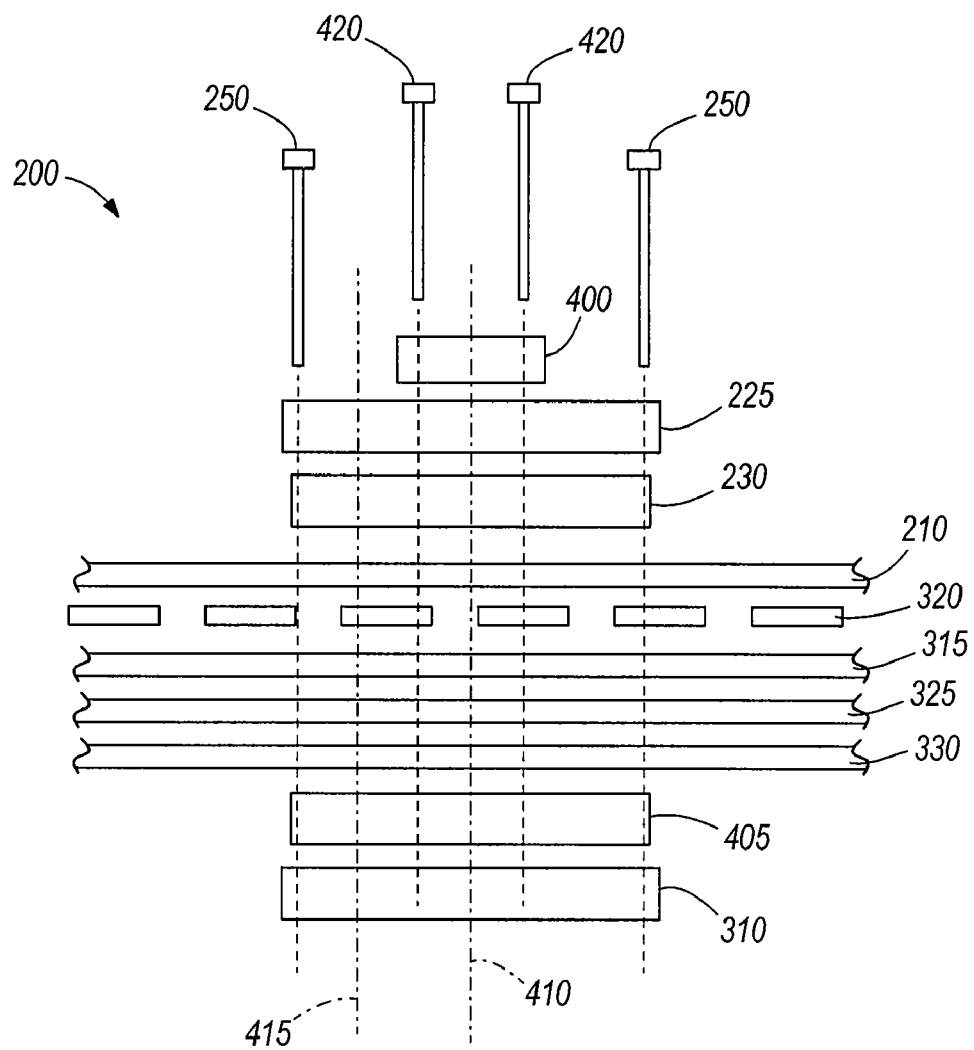
FIG. 4 shows an exploded side view of a portion of the inflatable plug of FIG. 2.

FIG. 4 shows an exploded side view of a portion of the plug 200. Assembly of the plug 200 is performed by positioning the bladder 330 over the bottom plate 310 and the second cushion 405. The bladder 330 is covered with the two inner fabric layers 315, 325, the webbing 320, and the outermost fabric layer 210. The top plate 225 and the cushion 230 are positioned on the outermost fabric layer 210, aligned with the bottom plate 310 and the second cushion 405.

The fasteners 250 pass through the top plate 225, the cushions 230, 405, the fabric layers 210, 315, 325, the bladder 330, and the bottom plate 310 to couple the top plate 225 and the bottom plate 310. The fasteners 250 are tightened (e.g., torqued) to compress the cushions 230, 405 and the fabric layers 210, 315, 325.

The air port 235 and the water port 240 are also provided through the top plate 225, the cushions 230, 405, the fabric layers 210, 315, 325, the bladder 330, and the bottom plate 310 to allow fluid communication between an exterior of the plug 200 and the interior region. In the embodiment illustrated in FIG. 4, the air port 235 is provided generally at line 415, and the water port 240 is provided generally at line 410. In some embodiments, instrumentation and/or fittings, such as ball valves, may be inserted through the plug layers to define the air port 235 and the water port 240.

The fasteners 420 pass through the bracket 400 of the tube 115, the top plate 225, the cushions 230, 405, the fabric layers 210, 315, 325, the bladder 330, and the bottom plate 310 to couple the tube 115 to the flange 205. Similar to the fasteners 250 discussed above, the fasteners 420 may be tightened to further compress the cushions 230, 405 and the fabric layers 210, 315, 325.

In some embodiments, the bladder 330, the fabric layers 210, 315, 325, and the cushions 230, 405 may include prior-made slits or cut-outs to facilitate passing of the fasteners 250, 420 and/or fittings defining the air port 235 and the water port 240 between the top plate 225 and the bottom plate 310.

After the flange 205 is secured, edges of the bladder 330 are sewn together to form a closed bladder. Likewise, edges of the fabric layers 210, 315, 325 are sewn together to surround the bladder 330 to form the plug 200. A sealant (e.g., silicone, polyurethane gel, etc.) is applied to seams formed during sewing to prevent fluid leakage therethrough. In some embodiments, single pieces of the bladder 330 and the fabric layers 210, 315, 325 are used to form the plug 200. In other embodiments, multiple pieces of bladder material and/or fabric material are sewn together to form the plug 200. In addition, multiple stitches may be used to increase the strength of the plug 200.

Figure 5:
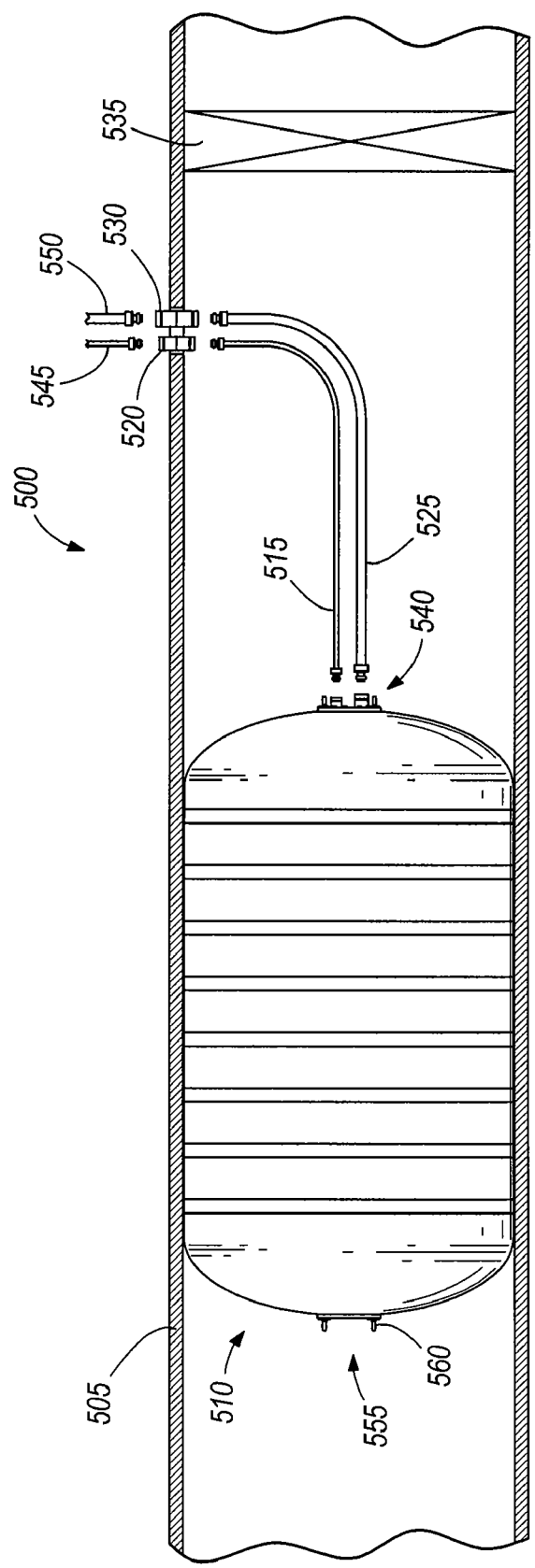
FIG. 5 shows a system according to another embodiment of the invention.

FIG. 5 shows a system 500 according to another embodiment of the invention. The system 500 includes an inflatable plug 510, an air hose 515, a water hose 525, an air valve 520, and a water valve 530. The system 500 is configured for use in a conduit 505, and the plug 510 is insertable into the conduit 505 in a similar manner to that discussed with reference to FIG. 1. However, in this embodiment, the plug 510 is positioned in the conduit 505 upstream from a hole through which the plug 510 is inserted. A valve 535 (e.g., a butterfly valve) is positioned in the conduit 505 downstream from the hole to prevent backflow in the conduit 505 from contacting the air and water hoses 515, 525.

The air hose 515 and the water hose 525 are coupled to and in fluid communication with the plug 510 via a flange 540. In the illustrated embodiment, the flange 540 is positioned on an end of the plug 510 and couples to the air hose 515 and the water hose 525 to facilitate fluid flow into and out of the plug 510. The air hose 515 extends from the flange 540 and couples to the air valve 520 (e.g., a ball valve with quick connect/disconnect couplings), and the water hose 525 extends from the flange 540 and couples to the water valve 530 (e.g., a ball valve with cam and groove couplings). The air valve 520 couples to an air line 545 which provides air, nitrogen, or other gases through the air hose 515 toward the plug 510. The water valve 530 couples to a water line 550 which provides water or other fluids through the water hose 525 toward the plug 510.

In some embodiments, the water hose 525 may be a suction hose, and the water line 550 may be a suction line. In such embodiments, the plug 510 is filled with fluid only through the air hose 515, and the fluid is discharged from the plug 510 through the suction hose 525. In addition, in some embodiments, the flange 540 may include anchor lugs to facilitate movement (e.g., dragging) of the inflated plug 510.

A second flange 555 is secured to an end of the plug 510 opposite from the flange 540. The second flange 555 includes anchor lugs 560 to facilitate movement of the inflated plug 510. In some embodiments, the second flange 555 may include fluid ports such that the plug 510 may be inflated and deflated at either end.

Figure 6:
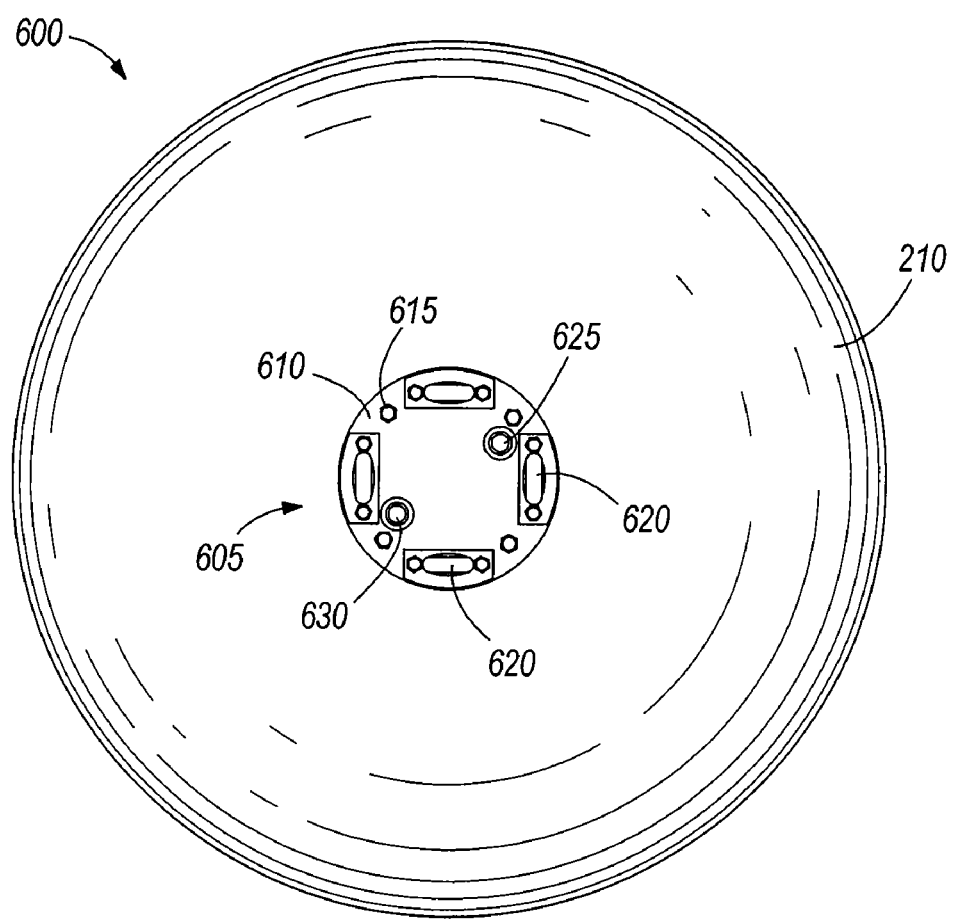
FIG. 6 shows an end view of an inflatable plug having a flange according to another embodiment of the invention.

FIG. 6 shows an end view of an inflatable plug 600 having a flange 605 according to another embodiment of the invention. The plug 600 and the flange 605 are one implementation of the plug 510 and the flange 540 of FIG. 5. In addition, the plug 600 is generally the same in structure and function as the inflatable plug 200 discussed with reference to FIGS. 2-4, and like parts have been given the same reference numerals.

The flange 605 is positioned on an end of the plug 600 and includes a top plate 610 and a bottom plate 700 (see FIG. 7) coupled to the top plate 610 via fasteners 615 (e.g., bolts, screws, nails, etc.). The fasteners 615 are positioned along a circumference of the top plate 610 and extend through the top plate 610 to the bottom plate 700. In the illustrated embodiment, some of the fasteners 615 include an eye hole 620. The eye holes 620 facilitate movement and/or anchoring of the plug 600 within the conduit 505.

The flange 605 includes a water port 630 and an air port 625 similar to the water port 240 and the air port 235 discussed with reference to FIG. 2. In the illustrated embodiment, the water port 630 and the air port 625 are positioned on radially opposite sides of the flange 605.

Figure 7:
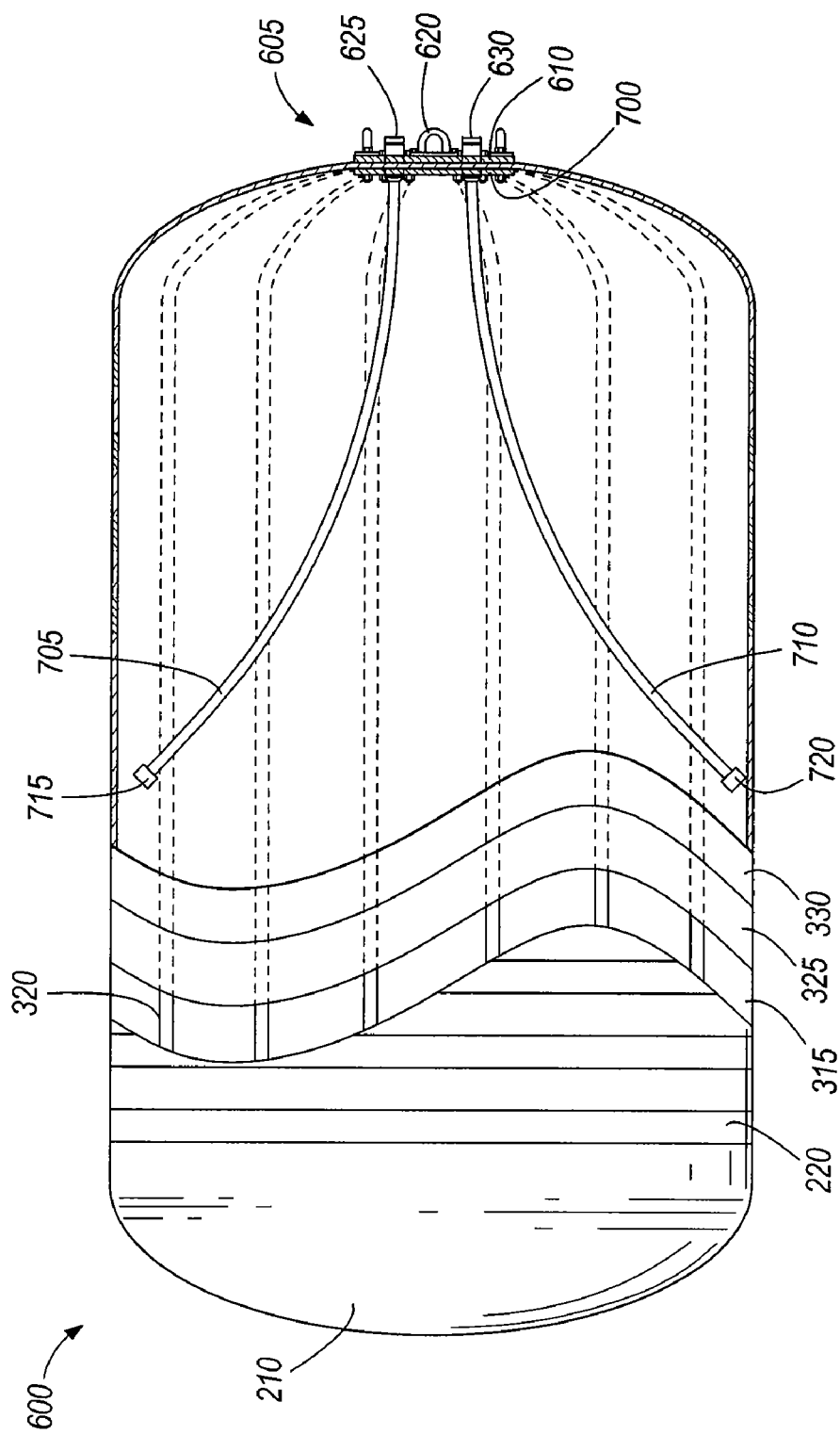
FIG. 7 shows a partial cross-sectional view of the inflatable plug of FIG. 6.

FIG. 7 shows a partial cross-sectional view of the inflatable plug 600. As discussed above with reference to FIGS. 2-4, the plug 600 includes the bladder 330, the inner fabric layers 315, 325, the webbing 320, the outermost fabric layer 210, and the outer straps 220, similar to the inflatable plug 200.

In addition, the plug 600 includes an air tube 705 with a float 715 and a water tube 710 with a weight 720. The air tube 705, the water tube 710, the float 715, and the weight 720 function in a similar manner to the air tube 300, the water tube 305, the float 335, and the weight 340 of the plug 200 discussed above with reference to FIG. 3.

In some embodiments, an inflatable plug may include a flange positioned on an edge and a flange positioned on an end. As such, a single plug may be positioned in a conduit adjacent to a hot tap in one scenario and upstream from the hot tap in another scenario. The flange may also be off center for inflation and deflation near a conduit invert or on a portion of the outer surface of the plug.

In other embodiments, an inflatable plug may be a non-cylindrical shape. For example, the plug may be spherical or conical to correspond with the shape of a conduit.

Embodiments described above allow for higher inflation pressures and are more flexible than existing molded rubber plugs. Embodiments also allow for easier positioning and insertion of plugs through hot taps and restricted access into conduits.

Furthermore, in various embodiments, bunching or swaging of material is not required to couple a flange on a plug, making the plug material less susceptible to failure than existing plugs with swaged collars.

Embodiments herein also allow for inflation and deflation on an end or on a side of a plug. In embodiments where a flange is positioned on the side of the plug, the plug does not need to navigate a bend for hot tap insertion and, therefore, does not require an inflation swivel. In addition, a shorter inflation ram and launch cylinder may be used to guide the plug.

Various features and advantages of the invention are set forth in the following claims.

What is claimed is:

1. An inflatable plug insertable into a conduit and inflatable therein to restrict fluid flow, the inflatable plug comprising:
   a bladder having an interior surface and an exterior surface;
   at least one fabric layer covering at least a portion of the exterior surface of the bladder;
   a first plate positioned inside the bladder and adjacent to the interior surface of the bladder;
   a second plate positioned outside the bladder and adjacent to the at least one fabric layer, the second plate coupled to the first plate, such that the first plate and the second plate clamp a portion of the at least one fabric layer and a portion of the bladder therebetween; and
   at least one fluid port extending through the first plate and the second plate to facilitate inflation and deflation of the bladder,
   wherein the second plate is secured to the first plate by at least one fastener spaced from the at least one fluid port.

2. The inflatable plug of claim 1, wherein the first plate and the second plate are positioned at an end of the bladder.

3. The inflatable plug of claim 1, wherein the first plate and the second plate are positioned at a side of the bladder.

4. The inflatable plug of claim 1, wherein the bladder is constructed of a polyurethane material.

5. The inflatable plug of claim 1, wherein the at least one fabric layer includes an outer layer, two inner layers, and a plurality of webbing straps positioned between the outer layer and the two inner layers.

6. The inflatable plug of claim 1, and further comprising a plurality of circumferential outer straps positioned outside the outer bladder and adjacent to the at least one fabric layer.

7. The inflatable plug of claim 1, and further comprising a cushion positioned between the bladder and the first plate.

8. An inflatable plug insertable into a conduit and inflatable therein to restrict fluid flow, the inflatable plug comprising:
   a bladder having an interior surface and an exterior surface;
   at least one fabric layer covering at least a portion of the exterior surface of the bladder;
   a first plate positioned inside the bladder and adjacent to the interior surface of the bladder;
   a second plate positioned outside the bladder and adjacent to the at least one fabric layer, the second plate coupled to the first plate, such that the first plate and the second plate clamp a portion of the at least one fabric layer and a portion of the bladder therebetween; and
   at least one fluid port extending through the first plate and the second plate to facilitate inflation and deflation of the bladder,
   wherein the at least one fluid port includes an air port to facilitate movement of air into and out of the bladder, and a water port to facilitate movement of water into and out of the bladder, the air port and the water port at least partially defined by at least one hole in the second plate.

9. The inflatable plug of claim 8, and further comprising a tube coupled to the air port, wherein the tube includes a float and extends into the bladder.

10. The inflatable plug of claim 1, wherein the at least one fluid port includes a ball valve.

11. The inflatable plug of claim 1, wherein the second plate is coupled to the first plate by a plurality of bolts.

12. The inflatable plug of claim 11, wherein at least one of the bolts includes an eye hole to facilitate at least one of movement and anchoring of the plug.

13. The inflatable plug of claim 1, wherein the plug is cylindrical and has a diameter between about 4 inches and about 120 inches.

14. The inflatable plug of claim 1, wherein at least one of air, nitrogen, and water flows through the at least one fluid port to inflate the bladder.

15. The inflatable plug of claim 1, wherein the first plate and the second plate have substantially the same cross-sectional dimensions such that the first plate is alignably positioned with the second plate.

16. A method of assembling an inflatable plug, the assembled plug insertable into a conduit and inflatable therein to restrict fluid flow, the method comprising:
   positioning a bladder material having an outer surface on top of a first plate;
   covering the outer surface of the bladder material with at least one fabric layer;
   positioning a second plate on top of the at least one fabric layer;
   coupling the first plate to the second plate with at least one fastener;
   forming a closed bladder using at least the bladder material; and
   inserting a fluid port through the first plate and the second plate to facilitate inflation and deflation of the closed bladder wherein the fluid port is spaced from the at least one fastener.

17. The method of claim 16, wherein the first plate is coupled to the second plate with bolts.

18. The method of claim 16, wherein forming a closed bladder includes sewing edges of the bladder material together to form a closed bladder.

19. The method of claim 16, wherein the bladder material includes a plurality of pieces, and forming a closed bladder includes connecting the plurality of pieces together to form a closed bladder.

20. The method of claim 16, and further comprising providing an air port and a water port through the first plate and the second plate.

21. The method of claim 20, wherein providing an air port and a water port includes providing a first pair of holes through the first plate and providing a second pair of holes through the second plate.

22. The method of claim 20, wherein the air port and the water port are the same port.

* * * * *